United States Patent [19]

Patel et al.

[11] Patent Number: 5,385,783
[45] Date of Patent: Jan. 31, 1995

[54] HIGH TEMPERATURE-RESISTANT MASKING TAPE

[75] Inventors: Bharat Patel, Mt. Vernon; Phil Bianchini, Bronx; Nilufer Tanrikulu, Tuckahoe, all of N.Y.

[73] Assignee: Tesa Tape Inc., Charlotte, N.C.

[21] Appl. No.: 118,544

[22] Filed: Sep. 8, 1993

[51] Int. Cl.$^6$ ............................ C09J 7/04; C09J 7/02; B32B 7/12
[52] U.S. Cl. ........................ 428/353; 428/153; 428/343; 428/352; 428/354; 428/355; 428/356; 427/208.2
[58] Field of Search .................. 428/153, 154, 40, 343, 428/352, 353, 354, 355, 356; 427/208, 208.4, 208.8, 208.2

[56] References Cited

U.S. PATENT DOCUMENTS

| | | | |
|---|---|---|---|
| 2,725,981 | 12/1955 | Abere et al. | 428/153 |
| 2,848,105 | 8/1958 | Bartell et al. | 428/153 X |
| 2,940,591 | 6/1960 | Swedish, Jr. et al. | 428/153 |
| 2,941,661 | 6/1960 | Picard et al. | 428/153 |
| 2,954,868 | 10/1960 | Swedish, Jr. et al. | 428/153 |
| 3,124,558 | 3/1964 | Stucker et al. | 428/153 |
| 3,503,495 | 3/1970 | Gustafson et al. | 428/153 |
| 4,294,936 | 10/1981 | Korpman | 428/355 X |
| 4,609,571 | 9/1986 | Tytke | 428/354 X |
| 4,668,576 | 5/1987 | Yotsuya et al. | 428/356 X |
| 5,209,973 | 5/1993 | Wille et al. | 428/343 X |

*Primary Examiner*—Daniel R. Zirker
*Attorney, Agent, or Firm*—Sprung Horn Kramer & Woods

[57] ABSTRACT

In a high temperature-resistant masking tape comprising
 a) a paper substrate,
 b) an impregnant in said paper substrate,
 c) a release coat on one surface of said paper, and
 d) an adhesive on the other surface of said paper,
the improvement wherein the adhesive comprises a cured mixture of natural rubber and at least one of a butyl and acrylic synthetic rubber, whereby the tape is capable of withstanding high temperatures.

5 Claims, 1 Drawing Sheet

HIGH TEMPERATURE-RESISTANT MASKING TAPE

The present invention relates to the making of a novel high temperature-resistant masking tape.

In the painting of automobile bodies and the like where it is desired to provide a sharp line of departure between what is to be painted and what is not to be painted, it is common practice to apply a masking tape to produce such a sharp line.

Such tapes work quite well but, if the painted article is subjected to a high drying temperature between several painting steps, the tape sometimes embrittles and/or pulls away from the article so paint can get under it in a later painting step and/or some adhesive from the tape remains on the article when the tape is removed. Even if such remaining adhesive can be cleaned off, it must be done manually and is time consuming and costly.

Accordingly, in practice when the painted article is dried it is necessary that such drying takes place at a temperature no higher than about 165° C, and generally no higher than about 150° C. to avoid the indicated potential problems. This also places a lower time limit on the drying time, i.e. requires long drying times.

It is accordingly an object of the present invention to provide a paint masking tape which can withstand high temperatures without loss of properties, and which therefore can be employed with relatively high temperature, high speed processing of the painted tape-carrying substrate.

These and other objects and advantages are realized in accordance with the present invention pursuant to which there is provided a novel tape made by a novel process.

Specifically, in the known preparation of a high temperature-resistant masking tape comprising the steps (a) impregnating a tape; (b) applying to one face of said tape a release coat; (c) applying to the other face of said tape an adhesive, and (d) curing, in accordance with the invention between steps (b) and (c) there is applied to the tape a primer comprising a mixture of natural rubber and at least one carboxylated synthetic rubber, whereby the tape is capable of withstanding high temperatures.

The invention also provides a novel product, a high temperature-resistant masking tape comprising a) a paper substrate, b) an impregnant in said paper substrate, c) a release coat on one surface of said paper, and d) an adhesive on the other surface of said paper; pursuant to this invention the adhesive comprises a cured mixture of natural rubber and at least one of a butyl and acrylic synthetic rubber, whereby the tape is capable of withstanding high temperatures.

The cured mixture of natural and carboxylated synthetic rubbers is present as an interpenetrating network of a polymer of the natural rubber and of a polymer of the carboxylated synthetic rubber.

Advantageously the tape comprises a conventional crepe paper as heretofore used in this art, for example having a weight of about 20 to 40 pounds per ream of 3000 ft², preferably about 30 pounds per ream.

The tape is impregnated with an aqueous emulsion of rubbers, advantageously a mixture of carboxylated nitrile rubber latex and of carboxylated SBR rubber latex. Varying amounts of a carboxylated acrylic rubber latex may also be present, along with conventional additives such as pigments and anti-oxidants. Small amounts of polyethyleneglycol, particularly about mw 20,000 give better results.

If the impregnant contains only one of the rubber ingredients the resulting paper will tear after drying at 180° C. The drying forms extended polymeric chains, creating an interpenetrating network of polymer molecules, preventing separation.

The impregnant comprises an aqueous formulation of about 10 to 50% solids, preferably about 25%. It is applied to the paper in about 10 to 150%, advantageously about 25 to 100% and preferably about 50%, based on weight of latex solids and dry paper weight.

Preferred formulations are of the following composition, by dry weight;

| MATERIAL | DRY WEIGHT % |
| --- | --- |
| 1. CARBOXYLATED NITRILE RUBBER LATEX (HYCAR 1572X64) | 25–75% Preferably 45% |
| 2. CARBOXYLATED SBR RUBBER LATEX (GENFLO 3003) | 25–75% Preferably 45% |
| 3. CARBOXYLATED ACRYLIC RUBBER LATEX (TR 934) | 00–50% Preferably 10% |
| 4. POLYETHYLENE GLYCOL (PEG 20 M) | 00–03% |
| 5. PIGMENTS | 00–10% |
| 6. ANTI-OXIDANTS (AQUAMIX 110) | 00–02% |

The impregnated paper is thereafter dried and cured, either slowly at lower temperature or more rapidly at a temperature up to about 180° C.

To one face of the impregnated tape there is applied a conventional release coat which holds the layers together when rolled up but permits unrolling without tearing. The release coat is applied in relatively small amount, e.g. about 2 to 10 and preferably about 6 pounds of solids per ream of paper. A preferred formulation comprises a 10–90 mixture of one acrylate (Rohm & Haas Rhoplex P and a second acrylate (BASF Acronal S504) which also contains some nitrile and butadiene rubbers. The mixture gives substantially better results than the individual components alone. The mixture is applied as an emulsion of about 15 to 50% solids, preferably about 30%. The tape is then again dried.

To the second surface of the tape, i.e that to which the release coat was not applied, there is then applied a small amount of a primer, e.g. about 1 to 5 pounds and preferably about 1.5 to 2 pounds per ream, dry weight. It is applied as latex of about 15 to 50%, preferably about 25% solids. A carboxylated SBR rubber latex can be used alone but far better results are realized if it is admixed with other rubber lattices which by themselves are not suitable, e.g. a natural rubber and optionally an acrylic. The presence of an acrylic therein eliminates leaving a residue on the substrate, i.e. the car body, upon ultimate removal of the tape after baking. Advantageously a curing agent, preferably a phenol-formaldehyde curing agent, is also present in the prime coat in small amount.

Preferred primer formulations are of the following composition, by dry weight:

| MATERIAL | DRY WEIGHT % |
| --- | --- |
| 1. CENTRIFUGED AMMONIATED NATURAL RUBBER LATEX | 25–50% |
| 2. CARBOXYLATED SBR RUBBER LATEX (GENFLO 3003) | 50–75% |
| 3. CARBOXYLATED ACRYLIC | 00–25% |

| MATERIAL | DRY WEIGHT % |
|---|---|
| RUBBER LATEX (TR 934) | |
| 4. PHENOL-FORMALDEHYDE (CYMEL 385) | 0.5–2.5% |

The impregnated, release coated and primed paper is then again dried.

Then there is applied the adhesive formulation in about 20 to 50 pounds per ream, preferably about 30 to 40 pounds and more preferably about 35 pounds per ream, all on a dry basis.

The adhesive advantageously is applied as a solution of about 15 to 40%, preferably about 20 to 30% and most preferably about 25% solids. Its adhesive component is preferably natural rubber but the presence of up to 60% tackifiers, preferably about 3 to 50%, and especially a small amount of an acrylic rubber impart superior properties, e.g. flatness of the bond during painting and baking. Advantageously it also contains about 0.1 to 1% by weight of an anti-oxidant, advantageously a mixture of a phosphite and an amine, e.g. approximately equal weights of tris-(2,4-di-tert=butyl-phenyl) phosphite and an alkylated diphenylamine.

Preferred adhesive formulations are of the following composition, by dry weight:

| MATERIAL | DRY WEIGHT % |
|---|---|
| 1. NATURAL RUBBER | 45–50% |
| 2. ANTI-OXIDANTS | 0.5–1.0% |
| 3. POLYTERPENE TACKITYING RESIN | 00–10% |
| 4. ROSIN ESTER TACKITYING RESIN | 10–20% |
| 5. ZINC RESINATE | 05–35% |
| 6. ACRYLIC RUBBER ADHESIVE (AVERY 315 HVX) | 00–15% |
| 7. ZINC OXIDE | 02–07% |
| 8. PHENOLIC CURING AGENT (SP 10518) | 03–10% |

Again the tape is dried and then rolled up on a core, and optionally later re-wound. The tape is cut in parallel lines to form rolls of predetermined widths and lengths.

Sometimes the acrylic in the topmost coat of adhesive will tend to migrate out onto the automobile body, leaving a residue upon baking. However, the primer, particularly containing an acrylic, eliminates such tendency. Without wishing to be bound thereby, possibly the acrylic in the topmost coat migrates in the other direction to the primer rather than to the auto body.

Other adhesive formulations for topcoats, e.g. containing a butyl rubber in place of the acrylic rubber (6) noted hereinabove, can similarly result in migration of adhesive to the automobile body. However, if there is employed a primer containing such migratory adhesive, the migration to the automobile body will be avoided, i.e. by having a butyl rubber in both the adhesive and primer.

Furthermore, because the tapes can withstand high temperatures in curing, the possible paints employed to paint the automobile can also be expanded to include high temperature fast curing paints, permitting further economies in the overall painting operation.

The tapes will withstand oven baking at 180° C. for 20 minutes without cracking when removed from a metal surface and without leaving an adhesive residue thereon.

The invention will be further described with reference to the accompanying drawings, wherein.

Figure 1:
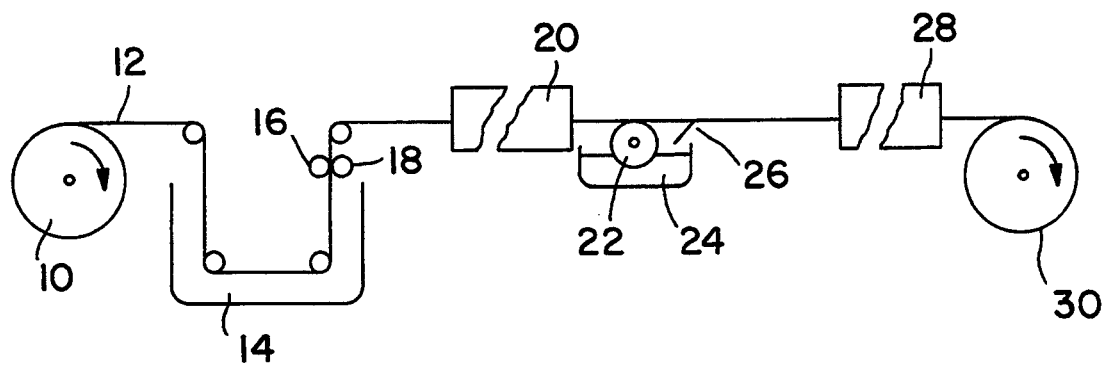
FIG. 1 is a flow sheet of the first part of a process in accordance with the present invention.

Referring now more particularly to FIG. 1, crepe paper 12 is unrolled from a roll 10 and immersed in a bath 14 of impregnant. Rolls 16,18 control the amount of pickup and the paper 12 then enters oven 20 where the liquid is evaporated, leaving dry impregnated paper.

The underface of the paper next contacts the top of a rotating roll 22 which dips into a stirred latex mixture of a release coat in vessel 24. A doctor blade 26 controls the amount of pick up and the under surface-coated impregnated paper is dried in oven 28 and rolled up at 30.

The roll 30 can therafter be employed for a variety of products within and outside of the present invention, the further processing being at speeds which may differ from the first stage.

Figure 2:
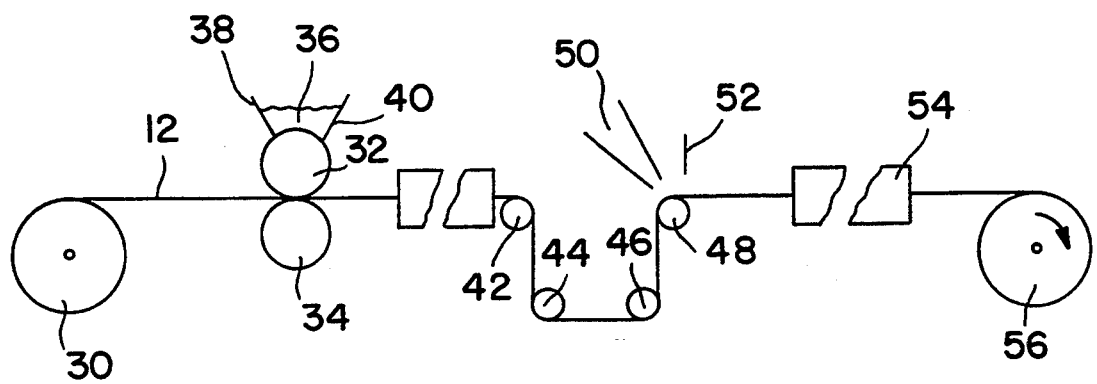
FIG. 2 is a flow sheet of the second part of the process in accordance with the present invention.

Turning now to FIG. 2, the roll 30 is unwound and the impregnated paper 12 is passed between a gravure roll 32 and a back up roll 34. To the top of gravure roll 32 there is applied a primer 36, doctor blades 38 and 40 controlling the pick up.

The paper 12 then passes through oven 41 and then about simple direction—changing rolls 42, 44, 46 and 48. Adjacent roll 48 adhesive solution is applied to paper 12 at 50 and knife 52, operating against roll 48 controls the pick-up; the apparatus is designed so that all direction changes occurred prior to such adhesive pick-up.

The paper 12 is dried in oven 54 and the paper is wound up at 56.

Thereafter the roll 56 can be cut into narrow widths and/or rewound into shorter rolls, as desired.

The moving paper may be supported in its travels by one or more moving belts, e.g. in and between the driers.

Figure 3:
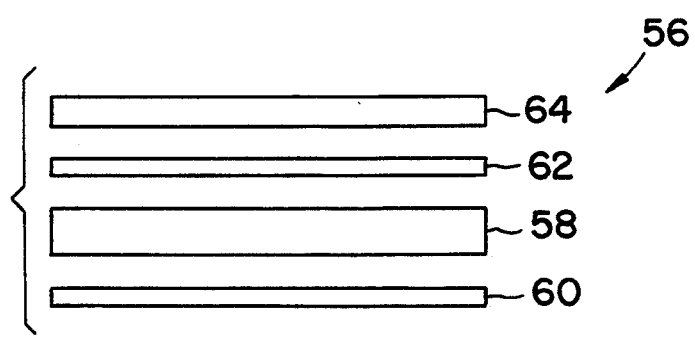
FIG. 3 is an enlarged exploded side view, not to scale, of the product of the invention.

The finished paper 56 is shown in exploded cross-section in FIG. 3, wherein 58 is the impregnated paper, 60 is the release coat, 62 is the primer and 64 is the adhesive.

The invention will be further described in the following illustrative example wherein all parts are by dry weight unless otherwise expressed.

EXAMPLE

Potsdam unbleached crepe paper 12 weighing 29.5 pounds per ream of 3000 ft$^2$ is impregnated and coated as shown in the drawing.

It picks up 50% of its dry weight of an impregnant of the following percentage composition, by weight:
carboxylated nitrile rubber latex (Hycar 1572×64) 43
carboxylated SBR rubber latex (genflo 3003) 43
carboxylated acrylic rubber latex (TR 934) 10
polyethylene glycol (PEG 20 M) 1
pigments 2
anti-oxidants (AQUAMIX 110) 1
and in oven 20 is dried for 10 seconds, starting at 500° F. and dropping to 325° F. to remove the water, i.e. dry and cure. The paper carries 50% its weight of solids.

By roll 22 and doctor blade 26 the paper picks up 6 pounds per ream, on dry weight, of an emulsion of the following composition by weight:

acrylate latex (Rhoplex P 225) 10%
acrylate Acronal (BASF) 90%

The water is removed in oven 28 at about 300° F. in about 1.3 minutes.

Roll 30 and blade 38 with gravure 32 apply 1.75 pounds per ream of primer latex of the following percentage composition, all based on dry weight:

centrifuged ammoniated natural rubber latex 33
carboxylated SBR rubber latex (GENFLO 3003) 60
carboxylated acrylic rubber (TR 934) 6
phenol-formaldehyde (CYMEL 385) 1

Water is removed in oven 36 at 300° F. in 0.6 minute.

The impregnated coated paper passes over roll 48 which, with doctor 52, deposits per ream 36 pounds, dry basis, of a 20% toluene solution of an adhesive composition, comprising by dry weight percentage:

NATURAL RUBBER 45
ANTI-OXIDANTS 1
POLYTERPENE TACKIFYING RESIN 5
ROSIN ESTER TACKIFYING RESIN 14
ZINC RESINATE 19
ACRYLIC RUBBER ADHESIVE (AVERY 315 HVX) 6
ZINC OXIDE 5
PHENOLIC CURE (SP 10518) 5

The toluene is removed in oven 54 in 4 minutes at 275° F. and one minute at 385° F., and wound up into a roll 56 which comprises by weight 33% of paper, 17% of impregnant, 7% of release coat, 2% of primer and 41% of adhesive.

It will be appreciated that the instant specification and claims are set forth by way of illustration and not limitation, and that various modifications and changes may be made without departing from the spirit and scope of the present invention.

What is claimed is:

1. In a high temperature-resistant masking tape comprising
   a) an impregnated paper substrate having a first and a second surface,
   b) a release coating on said first surface,
   c) a primer coating on said second surface, and
   d) an adhesive coating on said primer coating, the improvement comprising
      1) the primer comprising a mixture of a carboxylated SBR rubber latex, a natural rubber and an acrylic rubber, and
      2) the adhesive comprising a cured mixture of natural rubber and an acrylic synthetic rubber, wherein the tape is capable of withstanding a temperature of 180° C. for 20 minutes without cracking when removed from a metal surface and without leaving an adhesive residue thereon.

2. A masking tape according to claim 1, wherein the adhesive contains about 0.1 to weight of an antioxidant and wherein said antioxidant comprises a phosphite and an amine.

3. A masking tape according to claim 1, wherein the impregnant is present in about 25 to 100% based on the paper, dry weight, and comprises a mixture of carboxylated synthetic rubbers.

4. A masking tape according to claim 1, wherein the adhesive further comprises at least one tackifying resin present in about 30 to 60% by dry weight of the adhesive, and further contains about 0.1 to 1% dry weight of an antioxidant comprising a phosphite and an amine, wherein the paper substrate comprises a crepe paper weighing about 20 to 40 pounds per ream, and the impregnant comprises a mixture of carboxylated rubbers, and wherein the cured adhesive of natural and acrylic synthetic rubber is present as an interpenetrating network of the natural rubber and of the synthetic rubber.

5. A masking tape according to claim 3, wherein said mixture of carboxylated synthetic rubbers is a mixture of a carboxylated nitrile rubber latex, a carboxylated SBR rubber latex and a carboxylated acrylic rubber latex.

* * * * *

UNITED STATES PATENT AND TRADEMARK OFFICE
CERTIFICATE OF CORRECTION

PATENT NO.   : 5,385,783
DATED        : January 31, 1995
INVENTOR(S)  : Patel, et al.

It is certified that error appears in the above-indentified patent and that said Letters Patent is hereby corrected as shown below:

Col. 6, line 17   After " to " insert -- 1% dry --

Signed and Sealed this

Sixteenth Day of May, 1995

Attest:

Attesting Officer

BRUCE LEHMAN

Commissioner of Patents and Trademarks